US012669431B2

(12) United States Patent
Kaniak et al.

(10) Patent No.: US 12,669,431 B2
(45) Date of Patent: Jun. 30, 2026

(54) METHOD AND APPARATUS FOR TESTING MATERIAL JOINTS OR MATERIAL COMPOUNDS

(71) Applicant: XARION Laser Acoustics GmbH, Vienna (AT)

(72) Inventors: Georg Kaniak, Vienna (AT); Balthasar Fischer, Vienna (AT); Wolfgang Rohringer, Vienna (AT); Josef Pörnbacher, Vienna (AT); Stefan Wunderl, Vienna (AT); Christoph Weinmann, Vienna (AT)

( * ) Notice: Subject to any disclaimer, the term of this patent is extended or adjusted under 35 U.S.C. 154(b) by 300 days.

(21) Appl. No.: 18/537,752

(22) Filed: Dec. 12, 2023

(65) Prior Publication Data

US 2024/0192125 A1     Jun. 13, 2024

(30) Foreign Application Priority Data

Dec. 12, 2022     (EP) ..................................... 22212719

(51) Int. Cl.
*G01N 21/17*          (2006.01)

(52) U.S. Cl.
CPC . *G01N 21/1702* (2013.01); *G01N 2021/1706* (2013.01)

(58) Field of Classification Search
CPC .................... G01N 21/1702; G01N 2021/1706
See application file for complete search history.

(56) References Cited

U.S. PATENT DOCUMENTS 5,351,546 A * 10/1994 Terhune ............. G01N 29/2437
                                                              73/632
10,444,195 B2    10/2019 Bingham
(Continued)

FOREIGN PATENT DOCUMENTS

CN        205808816 U  * 12/2016
DE        102020105028 A1    8/2021
(Continued)

OTHER PUBLICATIONS

Bustamante, et al., "Nondestructive characterization of mechanical properties on metallic and polymer plates using hybrid laser-air coupled ultrasonic techniques", The International Journal of Advanced Manufacturing Technology, vol. 112, No. 5-6, XP037336632, ISSN: 0268-3768, DOI:10.1007/S00170-020-06463-8, Jan. 4, 2021, pp. 1767-1785.

*Primary Examiner* — Chico A Foxx
(74) *Attorney, Agent, or Firm* — Outside General Counsel, LLP; Alexander Franco

(57)          ABSTRACT

A method for testing material joints or material compounds includes: (a) providing an arrangement to be tested consisting of at least two components, connected via a material joint, (b) excitation of acoustic waves in at least one component, in the provided arrangement to be tested, with laser pulses from a laser light source, (c) detecting ultrasound waves in a gaseous layer adjacent to the provided arrangement to be tested with a membrane-free optical microphone, (d) evaluating the ultrasound waves detected by determining an acoustic pressure variation of the ultrasound waves; and (e) evaluating the respective material joint based on the occurring mode conversion of a symmetrical mode with a first out-of-plane deflection into an asymmetrical mode with a second out-of-plane deflection, and/or based on acoustic standing waves at resonant frequencies in the material joint.

20 Claims, 5 Drawing Sheets

(56)          References Cited

U.S. PATENT DOCUMENTS

| | | | |
|---|---|---|---|
| 11,378,551 B2 * | 7/2022 | Thomson | G01N 21/1702 |
| 2011/0048135 A1 | 3/2011 | Caron | |
| 2011/0108469 A1 * | 5/2011 | Yamamoto | G01N 33/346 |
| | | | 209/576 |
| 2017/0108472 A1 * | 4/2017 | Fischer | G01N 29/343 |
| 2019/0141456 A1 * | 5/2019 | Dogiamis | B06B 1/0625 |
| 2022/0244156 A1 * | 8/2022 | Van Den Bossche | |
| | | | G01N 29/4436 |
| 2024/0060935 A1 * | 2/2024 | Shi | G01N 29/041 |
| 2024/0142410 A1 * | 5/2024 | Van Den Bossche | G01N 3/34 |

FOREIGN PATENT DOCUMENTS

| | | | | | |
|---|---|---|---|---|---|
| EP | 3173781 | A1 | 5/2017 | | |
| JP | 7746861 | B2 * | 10/2025 | | G01N 21/88 |
| WO | WO-2007004574 | A1 * | 1/2007 | | G01N 29/225 |
| WO | 2020141479 | A1 | 7/2020 | | |

* cited by examiner 21, laser light source 23, membrane-free
optical microphone

20

22, fibre-coupled
optical module 30, arrangement
to be tested

24 first component

31

32 second
component

35

36    33    37    50, camera 26, control device 25    29

60

80, test item 21, laser light source 23, membrane-free
optical microphone

20

29

25

22, fibre-coupled
optical module

28

30

24 first component

31

26, control device

32 second
component

35

36    33    37    50, camera 80, test item 123, membrane-
free optical
microphone 50, camera

120

130,
battery
system

137

125

124

65, AI module

28

122, fibre-coupled
optical module 121, laser light source 126, control device

25

27 evaluation device computational processor database display

29

28

65, AI module

METHOD AND APPARATUS FOR TESTING MATERIAL JOINTS OR MATERIAL COMPOUNDS

BACKGROUND OF THE INVENTION

In different industries there is a need for ongoing quality control of the produced products. In some industries, each and every product has to be tested, in particular for safety reasons, such that it is guaranteed that there are, for example, no hidden cracks, inclusions or other material defects. There might also be the requirement to test if a proper contact between two materials exists. Such a contact could be, e.g., a bond layer, or a solder connection. In some cases, it is enough to test product samples from time to time, in some cases it is necessary to have an ongoing testing of the products.

US2011048135A1 shows a method and a system for continuous laser generation of ultrasound. Said system comprises a fiber laser for emitting a continuous wave optical beam, a movable mirror for steering said optical beam and a test material, which wherein an ultrasound wave is excited by said optical beam. Said ultrasound wave is emitted from said test material and interacts with a measurement optical beam of a further continuous wave laser. Said measurement optical beam interacts with said ultrasound wave by partially deflecting said measurement optical beam. Said deflected optical beam is focused by a focusing lens to a position-sensitive photodetector. Only the "direction of the optical beam path" is investigated. The disadvantage of the method or system is that it demands a position sensitive photo detector as a detector system to detect the ultrasound pulse emitted from the test object.

A membrane-free microphone is described in EP3173781A1 and US2017108472A1. The membrane free microphone is an optical microphone having no movable parts. The optical microphone directly measures the change of the refractive index in air, caused by the pressure difference within an ultrasound wave. The change of the refractive index is detected with an interferometer, a so-called Fabry-Perot-etalon, where a laser is reflected within a cavity of two partially reflecting mirrors. The wavelength of the laser is adjusted to the distance of the mirrors to establish positive interference conditions. Changing the refractive index of the medium within the cavity changes the interference conditions and alters the transmitted and reflected intensity of the laser, which is measured by a photodiode. The refractive index within the cavity is changed due to the influence of ultrasound waves which have a direct influence on the density of the therein enclosed medium which density has a direct influence on the velocity of the light.

DE102020105028A1 describes a method for testing the quality of a welded or bonded joint using a pulsed laser to excite acoustic waves in the material of an arrangement to be tested, and a broadband membrane-free optical microphone as a receiver. Here, the laser excitation and the membrane-free optical microphone are rigidly connected and positioned on one side of the assembly to be tested. In this disclosure a change in the acoustic pressure amplitude and the Lamb A0 mode coupled into the air as a leaky wave are evaluated. A generic method and device are disclosed in WO2020141479A1. The disadvantage of the method is that laser and the membrane-free optical microphone must be moved in one dimension over a significantly larger area over the arrangement to be tested. Said area is significantly larger than the investigated welded or bonded joint. In addition, the above-mentioned method requires the optical microphone to be next to welded joint.

U.S. Pat. No. 10,444,195B2 discloses a method of detecting near surface inconsistencies in a structure. A pulsed laser beam is directed towards the structure. Wide-band ultrasonic signals are formed in the structure when radiation of the pulsed laser beam is absorbed by the structure. The wide-band ultrasonic signals are detected to form data. The data is processed to identify a frequency associated with the near surface inconsistency. The disadvantage of the method is that a laser vibrometer is used as a detector and is arranged in pulse-echo mode. Said pulsed laser excites one point on the surface of the structure and said laser vibrometer using a laser beam as detection signal directed to the point and is used to measure said wide-band ultrasonic signal at the same point of the surface.

Leslie Bustamante et al., "Nondestructive characterization of mechanical properties on metallic and polymer plates using hybrid laser-air coupled ultrasonic techniques", The International Journal of Advanced Manufacturing Technology, vol. 112, no. 5-6, pages 1767-1785, XP037336632, ISSN: 0268-3768, DOI: 10.1007/S00170-020-06463-8. A laser excitation source is moved relative to a sample and is used to excite ultrasonic waves on the surface of the sample. An air-coupled ultrasonic testing (ACU) comprising a piezo-electric air-coupled transducer is used as a detector and is placed in a fixed position to the sample. The disadvantage of the method is that said ACU only detects in a narrow bandwidth regime and comprises a piezo element. Thus, an additional air-solid interface is provided, which causes a bad signal-to-noise ratio.

SUMMARY OF THE INVENTION

The present invention relates to a method for testing material joints or material compounds, a testing apparatus for testing material joints or material compounds, a computer program, and the usage of the testing apparatus. Various embodiments of the present invention concern methods for testing material joints or material compounds with at least one membrane-free optical microphone using a testing apparatus and/or a computer program. Membrane-free optical microphones are known from practice as novel devices for acoustic measurement. Such membrane-free optical microphones are manufactured and distributed by the company XARION Laser Acoustics GmbH. Such a membrane-free optical microphone does not use any mechanically moving parts. Ultrasound imaging methods both in industrial material testing and medical imaging are absolutely dependent on a high signal to noise ratio (SNR) to increase imaging contrast and penetration depth. Also, the SNR is a crucial parameter in NDT to detect and distinguish material defects. Increasing the SNR has always been a development focus for ultrasound imaging techniques.

An object of the present invention is to overcome the disadvantages of the prior art. It is further an object of the present invention to create an improved method for testing a material joint, a material interface, or a material compound to determine various quality features of the material joint, of a material interface or of a material compound. Furthermore, it is an object to provide an improved testing apparatus with an improved computer program, especially for testing narrowly defined geometries in the material joint, material interface, or material compound.

At least one of these objects has been solved by the features of the independent patent claims. Other preferred embodiments are indicated in the dependent claims.

According to a first aspect of the present disclosure, the object is achieved by a method for testing material joints or material compounds having at least the following steps:

a) providing an arrangement to be tested comprising at least two components, connected via at least one material joint or material interface;

b) exciting of acoustic waves in at least one component in the provided arrangement to be tested, with laser pulses from a laser light source;

c) detecting ultrasound waves in an air or gaseous layer adjacent to the provided arrangement to be tested with at least one membrane-free optical microphone;

d) evaluating the ultrasound waves detected with the at least one membrane-free optical microphone by determining an acoustic pressure variation of the ultrasound waves. Said acoustic pressure variation is preferably a variation of the acoustic pressure over time; and e) evaluating the respective material joint based on an occurring mode conversion of a symmetrical mode from a first out-of-plane deflection into an asymmetrical mode with a second out-of-plane deflection, wherein the conversion can occur when the at least one membrane-free optical microphone is positioned above the material joint and/or based on acoustic standing waves at resonant frequencies in the material joint.

Symmetrical acoustic waves may cause less out-of-plane deflection than asymmetrical acoustic waves and are therefore more difficult to detect for an air-coupled membrane-free optical microphone. However, due to the thickness change resulting from the material joint, a mode conversion of the higher velocity leading symmetric zero mode to an asymmetric mode occurs over a wide range of technically common thickness combinations. This converted mode has a pronounced out-of-plane deflection and is detectable, while said excitation point at the surface of the arrangement to be tested is spatially different to the detection area of the arrangement to be tested. The occurrence of this mode conversion and its properties, such as the amplitude or the spatial extent of its occurrence, are used to determine various quality features of the material joint, a material interface or a material compound. Furthermore, said disclosed method allows an improved testing of material joints or material compounds, especially in narrowly defined geometries of the material joint or material compound. E.g., an ultrasound wave signal may be detected above the material joint, and another ultrasound wave signal may be detected outside the material joint. An amplitude difference in the initial part of the signal arises due to the abrupt change in thickness in the region of the material joint through a mode conversion of the symmetrical zero mode leading with higher speed into an asymmetrical mode.

Alternatively or complementarily, said evaluation of the respective material joint is based on acoustic standing waves at resonant frequencies in the material joint. The ultrasound signal emitted by the standing waves contains information about material properties and thickness of the at least one component and defects in this investigated region of the arrangement to be tested, especially if the membrane-free optical microphone is positioned directly above the material joint. The thicknesses of the individual layers in the material joint (individual sheets or plates) and the overall thickness of the material joint result in resonance conditions for constructive interference, in which acoustic standing waves are formed. These acoustic standing waves in the material joint couple to the surrounding air or gas and generate an ultrasound wave that can be detected with the at least one membrane-free optical microphone, even if it is not positioned centrally above the investigated region of interest on the arrangement to be tested.

Said at least one membrane-free optical microphone detects ultrasound waves in an air or gaseous layer adjacent to the provided arrangement to be tested. Thus, a laser beam for detecting said ultrasound waves is not directed to the surface of the arrangement to be tested, nor interacts with the surface of the arrangement to be tested. Said arrangement to be tested is therefore not affected by the at least one membrane-free optical microphone.

In another embodiment, said laser light source is positioned completely or partially above the material joint. In this arrangement, the ultrasound signal emitted by the standing acoustic waves contains information about material properties, thicknesses, and defects in the material joint. In addition, the propagation time and amplitude of the acoustic waves generated at the surface and emitted directly in the direction of the at least one membrane-free optical microphone provide information about the nature and profile of the surface of the at least one component of the arrangement to be tested (such as the bead in the case of welds, or the tong impression in the case of spot-welded joints).

Since often, space around and accessibility to the arrangement to be tested is limited, a small-sized testing equipment of a testing apparatus is important. Also, the scanning/moving area of the testing equipment needs to be as small as possible, to allow the testing of confined spaces or mechanical structures which are difficult to access. Often, a material joint or an adhesive layer is close to an edge or to a material boundary of the arrangement to be tested. Hence, to be able to test these features, an inspection method is desirable which allows for many different scanning/moving patterns. For example, moving the membrane-free optical microphone (here the testing equipment) across the edge of the material into the free air will impact the measured signal in a negative way, hence a scanning/moving method is desirable which produces a meaningful result even when moved only over a very small region over the material joint. The inventive methods described herein allow to place the membrane-free optical microphone exactly above the material joint. Thus, measurement space is saved and very small arrangements to be tested measurable and material joint or an adhesive layer positioned close to an edge or to a material boundary of the arrangement to be tested are measurable with the herein disclosed method.

In particular, in step c) an array of membrane-free optical membranes may be used to detect ultrasound waves.

A material joint may also comprise at least one material interface of the at least two components. Said arrangement to be tested may comprise at least two sheet metal components. Said excitation of the acoustic waves in the at least one component is performed, in particular, in the region of the material joint or material compounds.

In another embodiment according to step e), the symmetrical mode comprises a smaller out-of-plane deflection, and the asymmetrical mode comprises a larger out-of-plane deflection.

In another embodiment the excited acoustic waves in step b) generate Lamb waves in at least one component in the provided arrangement to be tested. The laser pulses emitted from the laser light source and the at least one membrane-free optical microphone are moved in such a way that the at least one membrane-free optical microphone is located above the material joint. Laser pulses from the laser light source are applied to the two components connected by at least one material joint, e.g., welded or bonded joint, in order to excite Lamb waves within the arrangement to be tested. The excited Lamb waves propagate in the component whereby, as a result of an out-of-plane movement at the sheet metal surface, asymmetrical Lamb waves cause Leaky waves in adjacent air or gaseous layers. These Leaky waves are detected with the at least one membrane-free optical microphone.

Alternatively or complementarily, the excited acoustic waves in step b) generate longitudinal waves and/or Rayleigh waves in at least one component in the provided arrangement to be tested, which may be used to investigate the arrangement to be tested.

In another embodiment at least one optical image of the surface of at least one component is captured with an optical sensor. In particular, said optical sensor is an optical camera. In particular, said optical camera can generate images of the surface of the material to be tested. The at least one optical camera image data can generate supplementary or stand-alone statements about the arrangement to be tested, in particular the material joint. For a comprehensive assessment of the material joint or other properties of the arrangement to be tested regarding internal and external quality, the subject test method can be combined with image data. E.g., said optical camera is a CCD camera and may comprise a focusing unit. In particular, features of the camera images may be compared to the detected data of the at least one membrane-free microphone. Said camera may be connected to a control device and/or an evaluation device for data exchange.

Said optical camera may comprise a light source in the visible light region for illuminating the arrangement to be tested. Said light may be in wavelength region useful for light scattering to create light scattering pattern, which will be evaluated in the evaluation device. Alternatively, the light may be coherent and generate a structured pattern. This structured light can be used to analyze the surface properties by the optical camera.

Said optical camera is configured to determine the spatial position of at least one material joint or material interface at the arrangement to be tested. Said at least one membrane-free optical microphone is preferably positioned above a material joint based on information from a camera image and/or camera coordinates. Thus, accurate positioning of the at least one membrane-free optical microphone is possible, which further improves the method for testing the material joint. Thus, measurement space is further saved and very small arrangements to be tested measurable and material joint or an adhesive layer positioned close to an edge or to a material boundary of the arrangement to be tested are measurable.

Said optical camera may take images of the material joint at the arrangement to be tested, which can be compared with historical or saved data of material joints. Said evaluation device compares camera images with history images, loaded from a database. Thus, OK material joints can be distinguished from NOK material joints. Said camera images are preferably grey-scale images, which are easy to evaluate.

Alternatively or complementarily, at least one surface information of the surface of at least one component is captured with a profilometer. In particular, said profilometer can generate a relief of a surface of the arrangement to be tested. These profile data can generate supplementary or stand-alone statements about the arrangement to be tested or the material joint. For a comprehensive assessment of the material joint or other properties of the arrangement to be tested regarding internal and external quality, the subject test method can be combined with profile data. In particular, the profile data may be compared to the detected data of the at least one membrane-free microphone.

Said profilometer is configured to determine the spatial position of at least one material joint or material interface at the arrangement to be tested. Said at least one membrane-free optical microphone is preferably positioned above a material joint based on information from a surface profile or surface coordinates. Thus, accurate positioning of the at least one membrane-free optical microphone is possible, which further improves the method for testing the material joint. Thus, measurement space is further saved and very small arrangements to be tested measurable and material joint or an adhesive layer positioned close to an edge or to a material boundary of the arrangement to be tested are measurable.

In another embodiment at least one process parameter is recorded during the production of the material joint. Such process parameters like e.g., welding current, voltage, welting pressure, process duration, room temperature, specimen temperature, operating time, material parameters such as Young's modulus, geometric dimensions such as thickness, coating properties, joining material properties such as viscosity, adhesive thickness and others can be combined with the evaluation data to enable an even more accurate assessment of the arrangement to be tested.

In another embodiment the arrangement to be tested is provided comprising at least two components connected via at least one point-shaped or circular or bead-shaped material joint.

In another embodiment the arrangement to be tested is provided from at least two body components of a motor vehicle body, or an aircraft body, connected via at least one material joint. The invention can be used, in particular, for sheet metal body components made of steel or aluminum of a motor vehicle body or aircraft body in order to test welded joint or bonded joint.

In another embodiment the laser light source and the at least one membrane-free optical microphone are arranged on opposite sides of the arrangement to be tested. Preferably the at least one membrane-free optical microphone and the laser light source, or the fiber-coupled optic, move with respect to the arrangement to be tested is provided. Here, the excitation of the Lamb waves begins while the at least one membrane-free optical microphone is already above or close to the material joint, the laser excitation should be positioned above at least one component. Various scanning strategies are conceivable, one possibility is to travel with the at least one membrane-free optical microphone in two dimensions above the material joint. E.g., such an arrangement may be used to test a battery system.

In another embodiment the laser light source and the at least one membrane-free optical microphone are both arranged on the same side of the arrangement to be tested comprising the at least two components. For example, such an arrangement is used to test a material joint, a material compound or a material interface in a vehicle body or an aircraft body.

Preferably the at least one membrane-free optical microphone and the laser light source, or a fiber-coupled laser optic, move with respect to the arrangement to be tested. In particular the at least one membrane-free optical microphone moves over the material joint while the laser light source, or a fiber-coupled laser optic, moves along at a fixed distance from the at least one membrane-free optical microphone.

Alternatively, the laser light source, or a fiber-coupled laser optic, moves over the material joint while the at least one membrane-free optical microphone moves along at a fixed distance from the laser light source. Alternatively, the laser light source, or a fiber-coupled laser optic, or the at least one membrane-free optical microphone moves with respect to the arrangement to be tested comprising at least two components.

In another embodiment the laser light source, or a fiber-coupled laser optic, and the at least one membrane-free optical microphone move along the arrangement to be tested with a fixed spatial distance to each other. Thus, an enhanced spatially resolved scanning of the arrangement to be tested is possible.

In another embodiment the membrane-free optical microphone is moved in a grid-like or meander-like manner over the arrangement of the at least two components to be tested, preferably to make a measurement at each point of the grid. This grid should not have to be larger than the extent of the material joint in the two dimensions, which underlines the space saving by the present method. Alternatively or complementarily, the membrane-free optical microphone undergoes a distance variation with respect to the arrangement at fixed lateral position. Thus, the signal intensity of the laser emitted from the laser light source and/or signal-to-noise ratio of the detected signal is controllable.

Said at least one membrane-free optical microphone is preferably used to determine surface contours of the material joint by using time-of-flight measurements during detecting the ultrasound waves from the surface of the material joint. Therefore, the least one membrane-free optical microphone may be moved above the material joint, in a grid-like or meander-like manner, as disclosed above.

The distance between the pulsed laser, emitted from the laser light source or a fiber-coupled optic and the arrangement to be tested should preferably be in the range of 1 mm to 100 mm. The distance between the at least one membrane-free optical microphone and the arrangement to be tested should be between 1 mm to 10 mm. The distance between at least one membrane-free optical microphone and the pulsed laser, emitted from the laser light source or a fiber-coupled optic and excitation laser should preferably be between 0 (shoot through) to 100 mm. The excitation pulsed laser shot frequency shall preferably be in the range 10 Hz to 10 kHz, the traverse speed of the measurement apparatus shall preferably be between 10 mm/s to 800 mm/s. These distances and speeds may be essential for improving the method described herein.

In another embodiment the converted mode is evaluated by continuous wavelet transformation of the ultrasound waves. The continuous wavelet transform is advantageous, because it provides an overcomplete representation of a signal by letting the translation and scale parameter of the wavelets vary continuously. The ultrasound waves detected with the at least one membrane-free optical microphone can be transformed into a time-frequency representation using continuous wavelet transformation, which greatly facilitates the robust detection of the converted mode. Likewise, certain time ranges of the signals can be used after filtering. The input data can be one-dimensional in the sense of a feature vector or two-dimensional, corresponding to image data, time-frequency representation or other data projections. Continuous Wavelet Transform is very efficient in determining the damping ratio of oscillating signals. Continuous Wavelet Transform is also very resistant to the noise in the signal.

Alternatively or complementarily, acoustic standing waves, identified by Fourier or Wavelet transformation, are evaluated. Likewise, certain time ranges of the signals can be used after filtering. The input data can be one-dimensional in the sense of a feature vector or two-dimensional, corresponding to image data, time-frequency representation or other data projections.

In another embodiment an evaluation device is present which implements at least one of the following steps:
a) pre-processed data are evaluated by an expert system to predict physical properties of the material interface, such as size of the interface area, or presence of defects, voids, porosity, or deviation of material properties from expected value ranges. Pre-processed data may comprise at least ultrasound data, but potentially also camera image data, profilometer data or external process parameters.
b) feature vectors are extracted at least from the ultrasound waves. Feature vectors may be extracted in addition from camera image data, profilometer data or external process parameters.

Physical properties and features of the at least one component to be classified as OK or NOK by means of feature vectors include: the weld nugget diameter in a spot-welded joint; sticky joints ("Zinkkleber"), where only the zinc coating of the steel sheet contributes to the adhesion, which is therefore a weak adhesion; porosity inside a material compound or inside a welded joint; size and position of an internal void; material thickness; material surface geometry and other.

Said optical camera is preferable configurated to detect sticky joints or bad joints where only the surface coating, e.g., zinc, bonds, which manifest themselves as a shallow dent or a shallow indentation in the material joint. Said optical camera detects the shape, the deepness and/or the diameter of the dent of the sticky joint. Said measurement result of the deepness and/or diameter of the dent may be compared with the information comprised in the feature vectors described above. Thus, said evaluation device uses at least one information of a sticky joint based on camera images and at least one information of the sticky joint based on the detection with the at least one membrane-free optical microphone. This further improves the method for testing said material joints in the arrangement to be tested.

Said profilometer is preferable configurated to detect sticky joints, which manifest themselves as a shallow dent in the material joint. Said profilometer detects the depth and/or the diameter of the dent of the sticky joint. Said measurement result of the depth and/or diameter of the dent may be compared with the information comprised in the feature vectors described above. Thus, said evaluation device uses at least one information of a sticky joint based on surface information or/and at least one information of the sticky joint based on the detection with the at least one membrane-free optical microphone. This further improves the method for testing said material joints in the arrangement to be tested.

In particular, said feature vectors are transferred to an AI (Artificial Intelligence) module. The AI module preferably outputs either classifications or continuous estimates, and/or predicts at least one model for anomalies in the material joint. The AI model may apply machine learning algorithms, particularly but not limited to Support Vector Machine, Random Forest or Gradient-Boosted Tree models, or deep learning architectures based on neural networks, particularly but not limited to Convolutional Neural Networks, Transformer Networks or Autoencoder models.

The AI (artificial intelligence) module can then provide at least one characteristic value. In general, the AI module is used to build a statistical model based on training data, which is tested using test data and finally applied to the data of current joining processes in the production process. Among the algorithms that can be used are supervised ML algorithms, where a training data set is used to train a model that is applied to further evaluation data to calculate a classification (OK vs. NOK) or a regression (estimation of a continuous value—such as the force value of a destructive test), or non-supervised ML algorithms focusing on anomaly detection to find defects. Among the approaches to train such models are Deep Learning (artificial neural networks), where several layers of artificial neurons link the input variables (feature vector) with the output variable (classification, regression . . . ), including (temporal) Convolutional Neural Networks, Transformer Networks or various Auto-encoder models. Likewise, among numerous other machine learning methods, random forest algorithms (randomized decision trees) or support vector machines (estimation by means of support vectors in the vector space of the feature vectors) can be used, especially to limit the computational effort. For example, the generated FT coefficients for joining joints of OK workpieces are created and made available to the AI module as AI training data. This makes it possible to use the model trained in this way to predict for further acoustic signals whether, for example, the diameter of the material joint will be above or below a specified tolerance range or reference value. The AI module can thus provide essential parameters for the assessment of OK workpieces or NOK workpieces.

Preferably, the detected ultrasound waves are converted in electrical measurement signals and said electricals measurement signals are divided into signal blocks. In this way, the electrical measurement signals are quantized so that they can be used in an evaluation device in a simplified and improved way compared to the ultrasound signals. The signal-to-noise ratio in the evaluation device is improved. In particular, the signal length of a signal block is less than 100 ms, so that the signal-to-noise ratio in the further evaluation is further improved.

In particular, at least one signal block is transmitted to an AI module. The at least one signal block is used to obtain feature vectors that serve as the basis for machine learning algorithms in the AI (artificial intelligence) module. The AI module can then provide the at least one characteristic value. For example, reference measurements of welded joints of OK workpieces are created and made available to the AI module as AI training data. If classifying machine learning is used here and a destructive micrograph is made for a number of reference measurements (for example with good and reduced diameter) on the workpieces, it is possible to use the model trained in this way to predict for further acoustic wave signals whether the diameter will be above or below a specified tolerance range or reference value. The AI module can thus provide essential parameters for the assessment of OK workpieces or NOK workpieces.

Alternatively or complementarily, at least one signal block is transmitted to a regression module of the AI Module. The regression model can be trained in such a way that an expected diameter of the micrograph is estimated as a continuous value. This in turn may be stored in a table in the memory device, e.g., like a database.

Alternatively, or complementarily, a model for an anomaly detection attempts to predict at least the next signal block based on the previously recorded signal blocks. Reference data or various parameters may be taken into account.

Assuming that defects occur sporadically or infrequently, or are caused by abrupt changes in system behavior, a poor match between prediction and measurement data can be used to infer defects.

The invention discloses furthermore a test apparatus for testing of material joints, comprising at least one membrane-free optical microphone, a laser light source for emitting laser pulses, and an evaluation device, the evaluation device being at least designed to evaluate an ultrasound waves detected with the at least one membrane-free optical microphone by determining an acoustic pressure variation of the ultrasound waves, and to evaluate the respective material joint based on an occurring mode conversion of a symmetrical mode with a first out-of-plane deflection into an asymmetrical mode with a second out-of-plane deflection, preferably when the at least one membrane-less optical microphone is positioned above the material joint, and/or based on acoustic standing waves at resonant frequencies in the material joint. In particular, the evaluation device being designed to carry out the above disclosed method.

Symmetrical acoustic waves may cause less out-of-plane deflection than asymmetrical acoustic waves and are therefore more difficult to detect for an air-coupled membrane-free optical microphone. However, due to the thickness change resulting from the material joint, a mode conversion of the higher velocity leading symmetric zero mode to an asymmetric mode occurs over a wide range of technically common thickness combinations. This converted mode has a pronounced out-of-plane deflection and is detectable, while said excitation point at the surface of the arrangement to be tested is spatially different to the detection area of the arrangement to be tested. The occurrence of this mode conversion and its properties, such as the amplitude or the spatial extent of its occurrence, are used to determine various quality features of the material joint, a material interface or a material compound. Furthermore, said disclosed method allows an improved testing of material joints or material compounds, especially in narrowly defined geometries of the material joint or material compound. E.g., an ultrasound wave signal may be detected above the material joint, and another ultrasound wave signal may be detected outside the material joint. An amplitude difference in the initial part of the signal arises due to the abrupt change in thickness in the region of the material joint through a mode conversion of the symmetrical zero mode leading with higher speed into an asymmetrical mode.

In particular, said evaluation device being at least designed to evaluate the converted mode by continuous wavelet transformation of the ultrasound waves, as described above.

Alternatively said evaluation device being at least designed to evaluate the acoustic standing waves, identified by Fourier or Wavelet transformation, as described above.

In particular, said evaluation device is designed to implement at least one of the following steps:
  a) Pre-processed data are evaluated by an expert system to predict physical properties of the material interface, such as size of the interface area, or presence of defects, voids, porosity, or deviation of material properties from expected value ranges.
  b) Feature vectors are extracted at least from the ultrasound waves, and, in particular, are transferred to an AI module, while the AI module preferably outputting either classifications or continuous estimates, and/or predicting at least one model for anomalies in the material joint.

Pre-processed data may comprise at least ultrasound data, but potentially also camera image data, profilometer data or external process parameters. Feature vectors may be extracted in addition from camera image data, profilometer data or external process parameters.

A membrane-free optical microphone is particularly well suited as an acoustic waves pick-up device because it has no mechanically movable components and is therefore resonance-free. It is therefore unaffected by the processing device, like e.g., a welding machine. A diaphragm or membrane is not used in the optical microphone. The optical microphone essentially comprises two parallel mirrors between which a laser beam is arranged in interference conditions when the optical microphone is in use. The ultrasound waves arriving between the two parallel mirrors, which are emitted by the from at least one component of the arrangement to be tested interact with the laser beam. Thereby a change in the refractive index in the sound-propagating medium between the two parallel mirrors is caused due to the interaction of the ultrasound waves with the laser beam. This change or interaction is converted into the electrical measurement signals and sent to an evaluation device. Since the change of optical refractive index of a medium, induced by acoustic pressure, is not a function of the acoustics frequency (but only of its amplitude), the transducer's sensitivity is linear over the entire detection bandwidth and not dependent from the acoustic frequency. The electrical measurement signals are further processed. The detected ultrasound waves signals can be transformed to data signals in various ways to generate input data for an evaluation device, comprising e.g., an expert system or an AI (artificial intelligence) module.

The acoustic waves may also be incident in an angle close to orthogonal to the mirrors. By using a pulsed laser light source emitting one or several wavelengths, different laser wavelengths may be coupled into different materials with different efficiency.

Said laser light source for emitting laser pulses is particularly connected to a fiber-coupled optical module. Thus, the emitted laser pulses may be focused on the material joint for improved excitation of acoustic waves in the arrangement to be tested.

In another embodiment a control device is present which is connected to the at least one evaluation device and which is connected to at least the at least one membrane-free optical microphone for the exchange of signal data and command data.

Preferably, the control device provides command data for the evaluation device in order to create information indicative of the evaluation of the respective material joint on a display device. The information indicative of the evaluation of the respective material joint can be displayed like a C-Scan, where the amplitude is replaced by the value of a correlation index. The term C-Scan refers to a way of displaying measurement data of a 2-dimensional scan area, where preferably the amplitude of each point in the area is represented by a specific color of a color scale. Other suitable ways to display correlation data exist. They include A-scan images (time sequence plots), B-scan images (time vs. location plots), scatter plots, correlation matrix plot, function plots, 3D plots, and other. The command data comprise data for the at least one membrane-free optical microphone and/or for the laser light source and/or for the fiber-coupled optical device and/or for the optical camera and/or for the profilometer. Said command data may comprise a scanning speed for the above-mentioned devices, position information above the arrangement to be tested, scanning mode, and others.

In another embodiment the evaluation device comprises at least one expert system or AI module and preferably comprises at least one database.

In another embodiment at least one transfer device is present. At least said at least one membrane-free optical microphone is mounted on said at least one transfer device to move said at least one membrane-free optical microphone. Alternatively, or complementarily, said laser light source is mounted on said at least one transfer device to move said laser light source. Alternatively, or complementarily, said fiber-coupled optic is mounted on said at least one transfer device to move said fiber-coupled optic. Alternatively, or complementarily, said optical sensor is mounted on said at least one transfer device to move said optical sensor, especially said optical camera or profilometer. Preferably said transfer device comprise transfer units to move the before mentioned units of the transfer apparatus independently form each other.

The invention furthermore discloses a computer program comprising instructions which, when the computer program is executed by a computer, causes the test apparatus disclosed herein to perform a method disclosed herein.

The invention further discloses a usage of the above disclosed test apparatus for testing a battery system. Ultrasound testing of battery system or module, such as those found in electric cars. These battery systems may comprise battery cells, prismatic cells or pouches, cylindrical cells or others. The ultrasound penetrates the cell and provides information about the distribution of the electrolyte in the cell.

Alternatively, the residual moisture from the electrodes of such battery systems can be measured. For this purpose, an acoustic time-of-flight measurement or dispersion measurement is carried out. The arrangement is such that the laser light source and at least one membrane-free optical microphone are on the same side of the test specimen (i.e., the electrode), and the distance between the laser light source and at least one membrane-free optical microphone changes during the measurement by keeping one of them constant in position and moving the other by a mechanical traversing unit.

By means of the following figures, the invention is explained in more detail by means of examples of embodiments. The list of references is part of the disclosure.

Positional indications, such as "above", "below", "right" or "left" are in each case related to the corresponding embodiments and are not to be understood as restrictive.

Indications, such as "first", "second", or "further" are in each case related to the corresponding device and are not to be understood as restrictive or enumeration.

As will be appreciated by one skilled in the art, multiple aspects described in this summary can be variously combined in different operable embodiments. All such operable combinations, though they may not be explicitly set forth in the interest of efficiency, are specifically contemplated by this disclosure.

DETAILED DESCRIPTION

Figure 1:
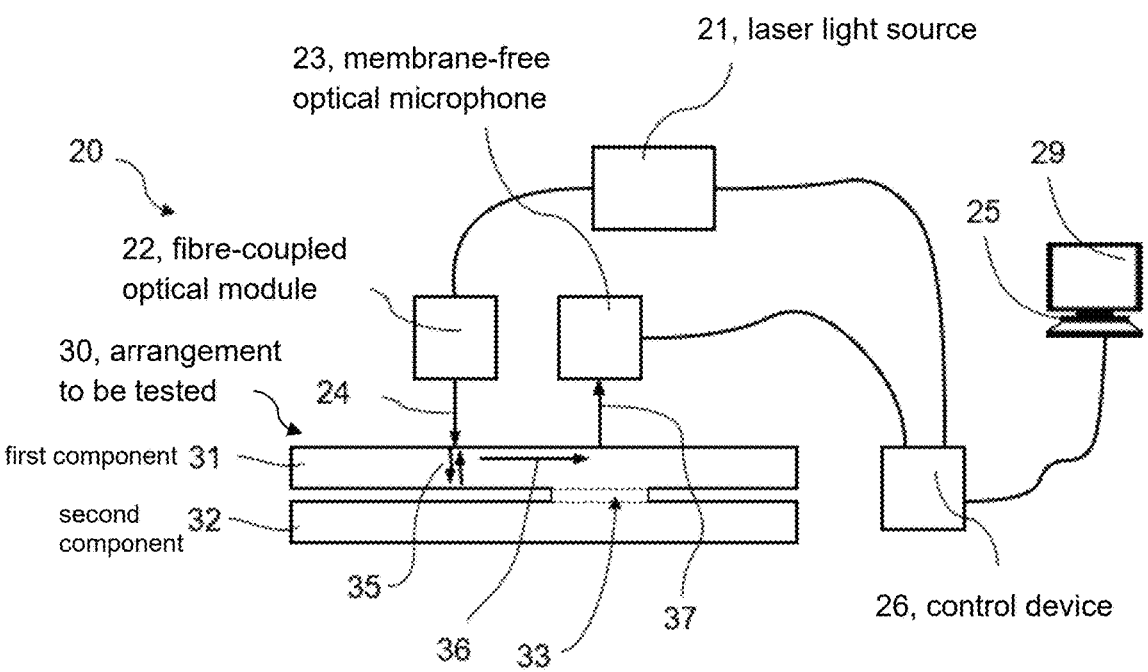
FIG. 1 shows a first inventive testing apparatus in a first arrangement for performing a method for testing material joints or material compounds in schematic view.

In order to facilitate better understanding of the present invention, reference is made below to the drawings. These show only exemplary embodiments of the subject matter of the invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art. In the figures and the associated description, identical or functionally analogous parts are provided with the same reference numerals.

FIG. 1 shows a first embodiment of the testing apparatus 20 for testing of material joints 33, comprising a membrane-free optical microphone 23, a laser light source 21 for emitting laser pulses 24, and an evaluation device 25. The evaluation device 25 is designed to carry out method disclosed herein. Said laser light source 21 for emitting laser pulses is connected to a fiber-coupled optical module 22. The laser light source 21 and the membrane-free optical microphone 23 are both arranged on the same side of the arrangement 30 to be tested. Furthermore, a control device 26 is present which is connected to the evaluation device 25 and which is therefore connected to the membrane-free optical microphone 23 and the laser light source 21 for the exchange of signal data and command data. The control device 26 provides command data for the evaluation device 25 to create information indicative to the evaluation of the respective material joint 33 on a display device 29. Said evaluation device 25 may comprise an AI (artificial intelligence) module 65 or an expert system 60, as described below in FIG. 6 to FIG. 8.

The arrangement 30 to be tested comprises two components 31, 32 connected via at least one point-shaped material joint 33. The pulsed laser 24 is emitted from the fiber-coupled optical module 22 to the surface of the component 31 of the arrangement 30, in a region outside the material joint 33. The membrane-free optical microphone 23 is positioned above the region of the material joint 33.

The membrane-free optical microphone 23 and the fiber-coupled optical module 22 move with respect to the arrangement 30 to be tested. Thereby, the membrane-free optical microphone 23 moves in a grid-like, in a two-dimensional manner, above the material joint 33, and make a measurement at each point of the grid, while the laser light source 21 moves along at a fixed distance from the membrane-free optical microphone 23. Laser pulses 24 from the laser light source 21 are applied to an arrangement 30 to be tested in order to excite Lamb waves 36 (acoustic waves) and/or acoustic standing waves 35 within the arrangement 30 to be tested. The excited Lamb waves 36 propagate in the component 31 whereby, as a result of an out-of-plane movement at the component surface, asymmetrical Lamb waves 36 and/or acoustic standing waves 35 cause Leaky waves 37 (ultrasound waves) in adjacent air layers. These Leaky waves 37 are detected with the membrane-free optical microphone 23.

Symmetrical Lamb waves 36 cause less out-of-plane deflection than asymmetrical acoustic waves and are therefore more difficult to detect for a membrane-free optical microphone 23. However, due to the thickness change resulting from the material joint 33, a mode conversion of the higher velocity leading symmetric zero mode to an asymmetric mode occurs over a wide range of technically common thickness combinations. This converted mode has a pronounced out-of-plane deflection and is detectable.

The converted mode is evaluated by continuous wavelet transformation of the Leaky waves 37. The Leaky waves 37 detected with membrane-free optical microphone can be transformed into a time-frequency representation. Likewise, certain time ranges of the signals can be used after filtering. The input data can be one-dimensional in the sense of a feature vector or two-dimensional, corresponding to image data, time-frequency representation, or other data projections.

The detected Leaky waves 37 are converted in electrical measurement signals and sent to the evaluation device 25. Said electricals measurement signals may be divided into signal blocks.

In addition to the Lamb waves 36 described above, longitudinal waves are also excited by laser pulses 24. The thicknesses of the individual layers in the material joint 33 as well as the overall thickness of the joint result in resonance conditions for constructive interference, in which standing acoustic waves 35 are formed. These standing acoustic waves 35 in the material joint 33 couple to the surrounding air and generate an ultrasound wave 37, which are detected with the membrane-free optical microphone 23, even if it is not positioned centrally above the region of the material joint.

Figure 2:
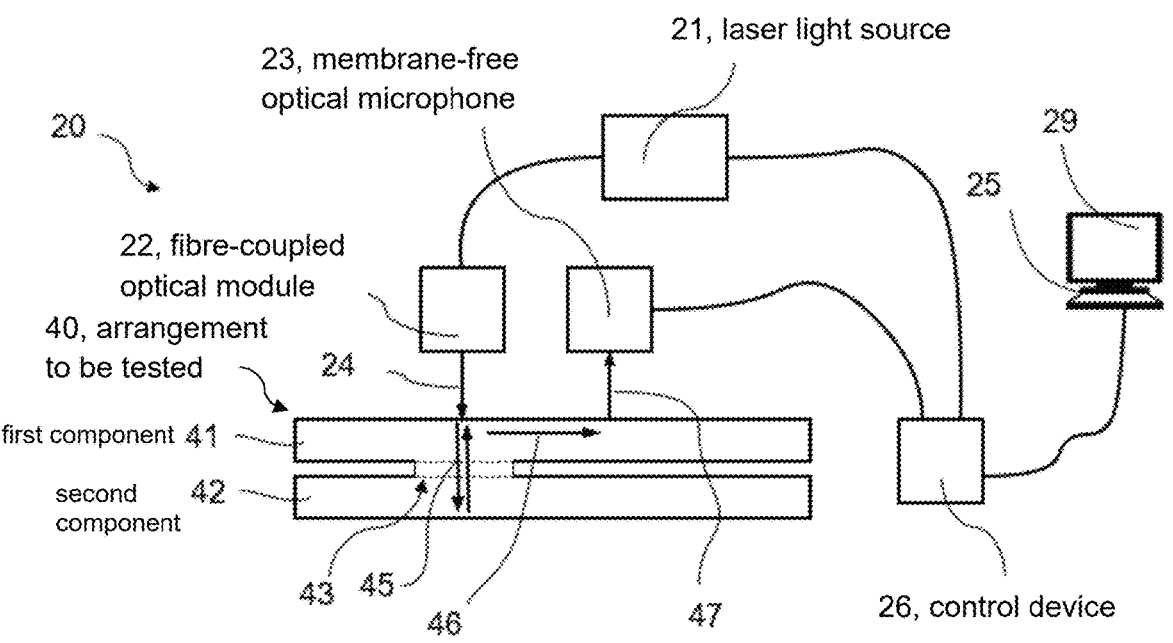
FIG. 2 shows the testing apparatus of FIG. 1 in a second arrangement for performing a method for testing material joints or material compounds in a schematic view.

FIG. 2 shows the testing apparatus 20 according to FIG. 1, while the pulsed laser 24 is emitted from the fiber-coupled optical module 22 to the surface of a component 41 of the arrangement 40, in a region above the material joint 43. The membrane-free optical microphone 23 is positioned outside the region of the material joint 43. If said pulsed laser 24 is positioned above the material joint 43, the ultrasound signal (Leaky waves 47) emitted by the Lamb waves 46 and/or acoustic standing waves 45 contains information about material properties, thicknesses, and defects in the material joint 43. In addition, the propagation time and amplitude of the Lamb waves 46 and/or acoustic standing waves 45 generated at the surface and emitted directly in the direction of the membrane-free optical microphone 23 provide information about the nature and profile of the surface of the component 41 (such as the bead in the case of welds, or the tong impression in the case of spot-welded joints). In this arrangement, the ultrasound wave 47 emitted by the standing acoustic waves 45 contains information about material properties, thicknesses (individual sheets as well as total thickness) and defects in the material joint. The detected ultrasound waves 47 are converted in electrical measurement signals and send to the evaluation device 25. Said electricals measurement signals may be divided into signal blocks.

Figure 3:
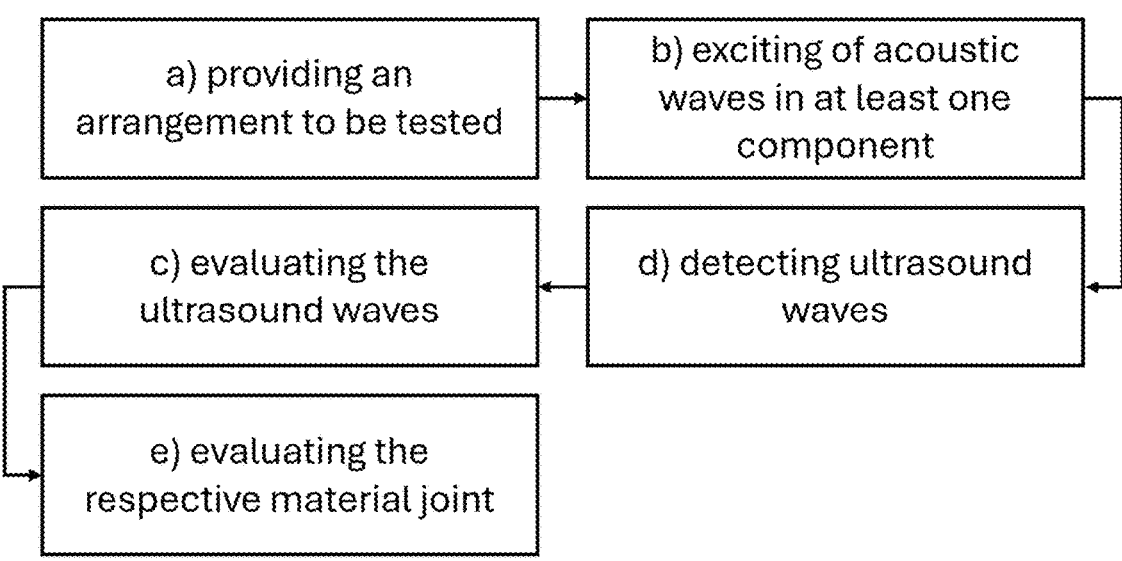
FIG. 3 shows a first inventive method for testing material joints or material compounds in a flow diagram.

FIG. 3 shows an embodiment of a method for testing material joints 33 or material compounds, described with the embodiment of the testing apparatus 20 according to FIG. 1. The method comprises at least the following steps:

a) providing an arrangement 30 to be tested comprising at least two components 31, 32, connected via at least one material joint 33;

b) exciting of acoustic waves 35, 36 in the component 31 in the provided arrangement 30 to be tested, with laser pulses 24 from a laser light source 21;

c) detecting ultrasound waves 37 in an air layer adjacent to the provided arrangement 30 to be tested with at least one membrane-free optical microphone 23;

d) evaluating the ultrasound waves 37 detected with the membrane-free optical microphone 23 by determining an acoustic pressure variation of the ultrasound waves 37; and e) evaluating the respective material joint 33, based on an occurring mode conversion of a symmetrical mode with a first out-of-plane deflection into an asymmetrical mode with a second out-of-plane deflection, where said symmetrical mode has a smaller out-of-plane deflection, and the asymmetrical mode has a larger out-of-plane deflection.

The fiber-coupled optic 22 and the membrane-free optical microphone 23 are moved along the arrangement to be tested, across the respective material joint 33 and into a further region outside the respective material joint 33, whereby the fiber-coupled optic 22 permanently applies laser pulses 24 to the arrangement 30 to be tested along this movement and the membrane-free optical microphone permanently detects ultrasound waves 37 caused by this. An acoustic pressure variation of the ultrasound waves 37 is determined along this movement in the evaluation device 25.

In an alternative embodiment of the method according to FIG. 3, an alternative step (e) concerning the evaluation is possible, where said evaluation of the respective material joint 33, is based on acoustic standing waves 35 at resonant frequencies in the material joint 33 in the method described in FIG. 3. The thicknesses of the individual layers in the material joint 33 (individual sheets or plates) and the overall thickness of the material joint result in resonance conditions for constructive interference, in which acoustic standing waves 35 are formed. These acoustic standing waves 35 in the material joint 33 couple to the surrounding air or gas and generate an ultrasound wave 37 that can be detected with the membrane-free optical microphone 21, even if it is not positioned centrally above the investigated region of interest on the arrangement to be tested.

In an alternative embodiment of the method according to FIG. 3, an alternative step (e) concerning the evaluation is possible, where said evaluation of the respective material joint 33, is based on acoustic standing waves 35 at resonant frequencies in the material joint 33 and is based on an occurring mode conversion of a symmetrical mode with a first out-of-plane deflection into an asymmetrical mode with a second out-of-plane deflection, as described above.

Figure 4:
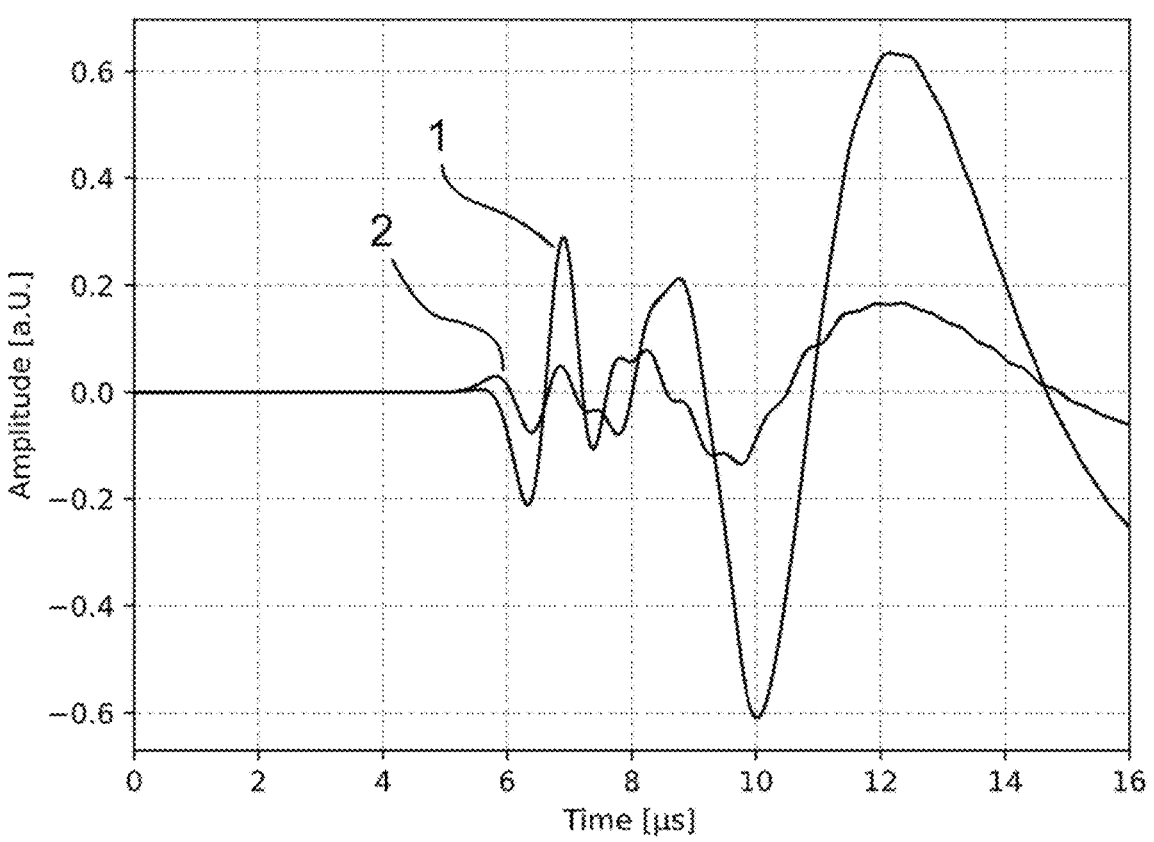
FIG. 4 shows in (1) a simulated time signal above the material joint, and in (2) a simulated time signal outside the material joint.

Said excitations in step (b) of the acoustic waves 35, 36 in the component 31 is performed in the region of the material joint 33 or material compounds and in a region outside the material joint 33—see FIG. 4. An amplitude difference in the initial part of the electrical signal arises due to the abrupt change in thickness in the region of the material joint 33 through said mode conversion of the symmetrical zero mode leading with higher speed into an asymmetrical mode. This excitation can be performed in the in the above-mentioned methods.

Figures 5, 6:
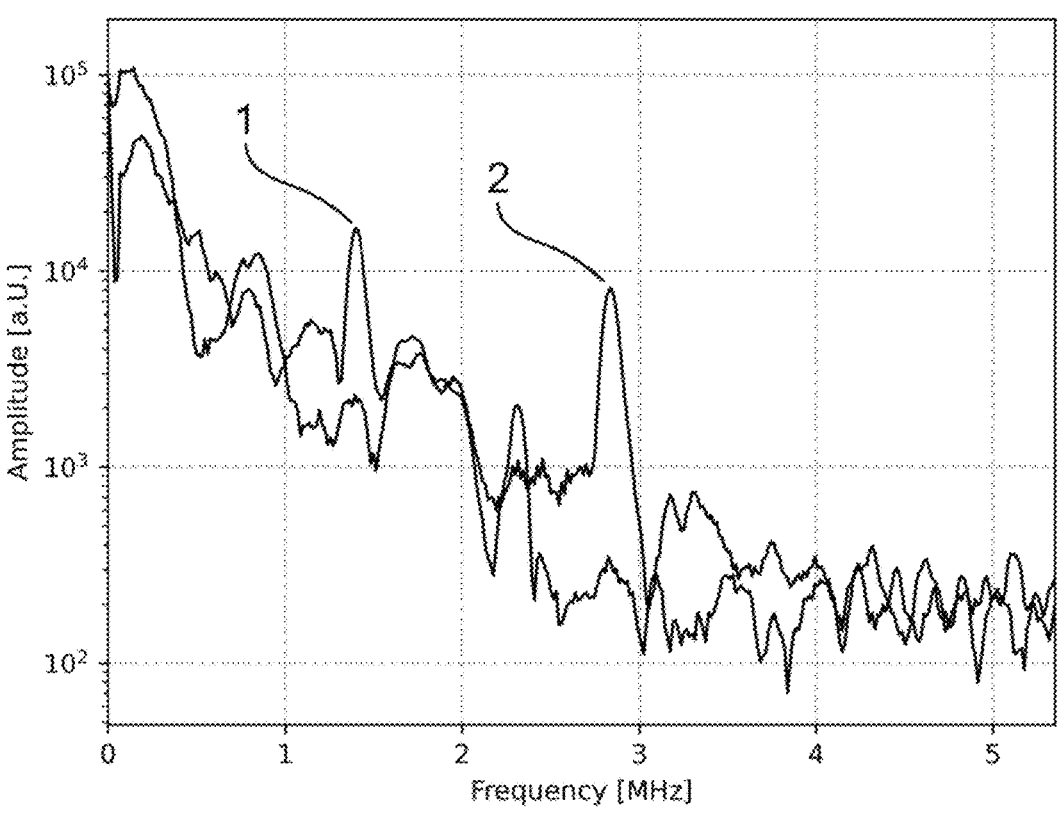
FIG. 5 shows typical frequency spectra of the resulting ultrasound signals measured by a membrane-free optical microphone in first arrangement (1) according to FIG. 1 and in a second arrangement (2) according to FIG. 2.
FIG. 6 shows a further testing apparatus according to FIG. 1 with an optical camera in a schematic view.

FIG. 5 shows frequency spectrum of the resulting ultrasound wave signals 37 measured by the membrane-free optical microphone 23 performed in the region of the material joint 33 or material compounds and in a region outside the material joint, which contain information on material properties and sheet thicknesses of the component 31. (1) shows the spectrum measured on a 2 mm thick steel plate, (2) shows the spectrum measured on a 1 mm thick steel plate.

FIG. 6 shows the testing apparatus 20 of FIG. 1, while in addition an optical camera 50 is disclosed, which is connected to the control device 26 and the evaluation device 25. The optical camera generates images of the surface of the material join 33 to be tested. The camera image data generates supplementary or stand-alone statements about the arrangement 30 to be tested, in particular the material joint 33. For a comprehensive assessment of the material joint 33 or other properties of the arrangement 30 to be tested regarding internal and external quality, the subject test method can be combined with image data. In addition, an expert system 60 is provided. Said expert system 60 evaluates pre-processed data to predict physical properties of the material interface, such as size of the interface area, or presence of defects, voids, porosity, or deviation of material properties from expected value ranges. Pre-processed data may comprise at least ultrasound data from the evaluation device 25, but also camera image data and external process parameters. Said expert system 60 may evaluate feature vectors, extracted at least from the ultrasound waves 37. Feature vectors may be extracted in addition from camera image data or external process parameters. Process parameter data is provided by a database connected to the expert system 60. Such process parameters like e.g. welding current, voltage, welting pressure, process duration, room temperature, specimen temperature, operating time, material parameters such as Young's modulus, geometric dimensions such as thickness, coating properties, joining material properties such as viscosity, bond thickness and others can be combined with the evaluation data to enable an even more accurate assessment of the arrangement 30 to be tested. Said evaluation device 25 may also comprise an AI Module 65 as described herein, using the data provided by the evaluation device 25 comprising electrical measurement signals from the membrane-free optical microphone 23 and image data from the camera 50.

Figures 7, 8:
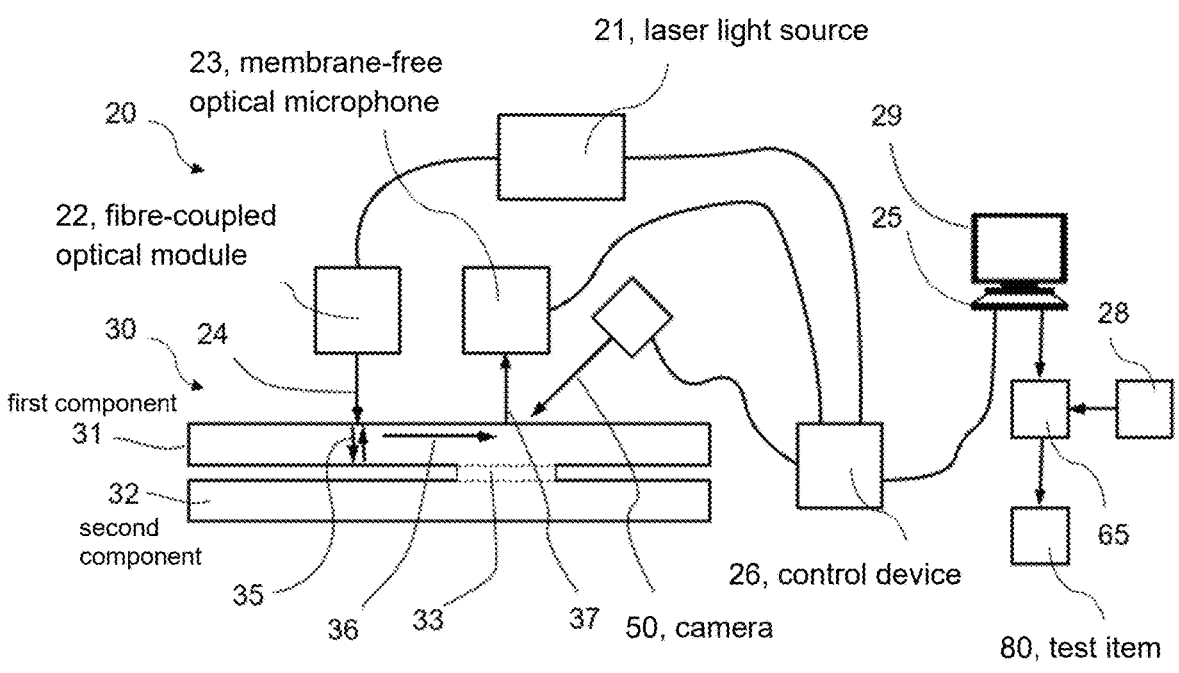
FIG. 7 shows a further testing apparatus according to FIG. 1 with a profilometer in a schematic view.
FIG. 8 shows another embodiment of the testing apparatus according to FIG. 6 in a schematic view.

FIG. 7 shows the testing apparatus 20 of FIG. 1, while in addition a profilometer 70 for capturing surface information of the surface of the component 31 in the provided arrangement 30 to be tested is disclosed, which is connected to the control device 26 and the evaluation device 25. Said profilometer 70 generates a relief of a surface of the arrangement 30 to be tested. These profile data generate supplementary or stand-alone statements about the arrangement 30 to be tested or the material joint 33. For a comprehensive assessment of the material joint 33 or other properties of the arrangement 30 to be tested regarding internal and external quality, the subject test method can be combined with profile data. In addition, an AI Module 65 is connected to the evaluation device 25. Pre-processed data and/or feature vectors are provided as evaluation data 25, which are processed using an AI model 65 to provide an accurate assessment of a test item 80. Pre-processed data may comprise at least ultrasound data from the evaluation device 25, but also camera image data, profilometer data or external process parameters from a database 28.

The AI module 65 puts out either classifications or continuous estimates, and/or predicting at least one model for anomalies in the material joint 33. The AI model may apply machine learning algorithms, particularly but not limited to Support Vector Machine, Random Forest or Gradient-Boosted Tree models, or deep learning architectures based on neural networks, particularly but not limited to Convolutional Neural Networks, Transformer Networks or Autoencoder models.

In addition, said AI module 65 provides at least one characteristic value for the test item 80. For example, the generated FT coefficients for joining material joints of OK arrangements 30 to be tested, are created and made available to the AI module 65 as AI training data. The AI module 65 provides essential parameters for the assessment of OK workpieces or NOK workpieces.

FIG. 8 shows another embodiment of a testing apparatus 120. In this embodiment the laser light source 121 and the membrane-free optical microphone 123 are arranged on opposite sides of the arrangement to be tested. Said arrangement is e.g., a battery system 130. The membrane-free optical microphone 123 and the fiber optical module 122 of the laser light source 121 move with respect to battery system 130. Here, the excitation of the Lamb waves 136 begins while membrane-free optical microphone 123 is already above the battery system 130. Ultrasound testing of battery system or module, such as those found in electric cars. These battery systems may comprise battery cells, prismatic cells or pouches, cylindrical cells or others. The ultrasound penetrates the cell and provides information about the distribution of the electrolyte in the cell.

Figure 9:
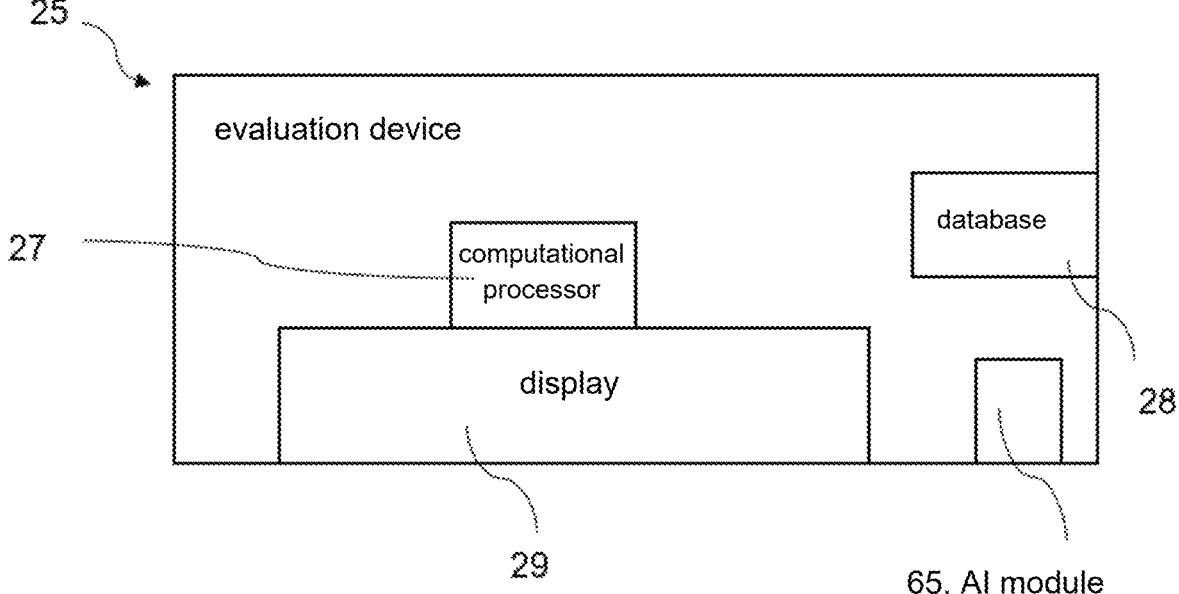
FIG. 9 shows evaluation device for any of the testing apparatus according to FIG. 1 and FIG. 6 to FIG. 8 in a schematic view.

FIG. 9 shows the evaluation device 25 described above as a computer, with a computer-readable medium comprising computer program. Said computer program comprises instructions which, when the computer program is executed by a computer, cause the computer to perform the methods disclosed herein. The evaluation device 25 comprises at least a computational processor 27 and a database 28 and is connected to the AI module 65. The previously described methods for testing material joints 33 or material compounds described herein, may be implemented as a computer-implemented method.

REFERENCE LIST 20 testing apparatus
21 laser light source
22 fiber-coupled optical module
23 membrane-free optical microphone
24 emitted laser pulses
25 evaluation device
26 control device
27 computational processor
28 database
29 display
30 arrangement to be tested
31 first component of 30
32 second component of 30
33 material joint/compound/interface
35 acoustic wave/acoustic standing waves
36 acoustic waves/Lamb waves
37 Ultrasound waves/Leaky waves
40 arrangement to be tested 41 first component of 30
42 second component of 30
43 material joint/compound/interface
45 acoustic wave/acoustic standing waves
46 acoustic waves/Lamb waves
47 Ultrasound waves/Leaky waves
50 camera
60 expert system
65 AI module
70 profilometer
80 test item
120 testing apparatus
121 laser light source
122 fiber-coupled optical module
123 membrane-free optical microphone
124 emitted laser pulses
125 evaluation device
126 control device
130 battery system
136 acoustic waves/Lamb waves
137 Ultrasound waves/Leaky waves

CONCLUSION

Although the subject matter has been described in terms of certain embodiments, other embodiments that may or may not provide various features and aspects set forth herein shall be understood to be contemplated by this disclosure. The specific embodiments set forth herein are disclosed as examples only, and the scope of the patented subject matter is defined by the claims that follow.

The invention also encompasses individual features shown in the figures, even if they are shown there in connection with other features and/or are not mentioned above. Further, the term "comprising", and derivatives thereof do not exclude other elements or steps. Likewise, the indefinite article "a" or "one" and derivatives thereof do not exclude a plurality. The functions of multiple features recited in the claims may be performed by a single unit. The terms "substantially", "approximately", "about" and the like in connection with a characteristic or a value define, in particular, also exactly the characteristic or exactly the value. All reference signs in the claims are not to be understood as limiting the scope of the claims.

The invention claimed is:

1. A method for testing material joints or material compounds, the method comprising:
    providing an arrangement to be tested, the arrangement comprising at least two components connected via at least one material joint or material compound;
    exciting, with laser pulses from a laser light source, of acoustic waves in at least one component in the provided arrangement to be tested;
    detecting ultrasound waves in an air or gaseous layer adjacent to the provided arrangement to be tested with at least one membrane-free optical microphone;
    evaluating the ultrasound waves detected with the at least one membrane-free optical microphone by determining an acoustic pressure variation of the ultrasound waves; and
    evaluating the at least one material joint or material compound based on an occurring mode conversion of a symmetrical mode with a first out-of-plane deflection into an asymmetrical mode with a second out-of-plane deflection.

2. The method of claim 1, wherein in the mode conversion, the symmetrical mode comprises a smaller out-ofplane deflection, and the asymmetrical mode comprises a larger out-of-plane deflection.

3. The method of claim 1, wherein at least one optical image of the surface of at least one component is captured with an optical sensor.

4. The method of claim 1, wherein at least one process parameter is recorded during production of the at least one material joint or material compound.

5. The method of claim 1, wherein the arrangement to be tested comprises at least two components connected via at least one point-shaped, circular, or bead-shaped material joint.

6. The method of claim 1, wherein the arrangement to be tested comprises at least two body components of a motor vehicle body or an aircraft body, the two body components connected via the at least one material joint or material compound.

7. The method of claim 1, wherein the laser light source and the at least one membrane-free optical microphone are both arranged on a same side of the arrangement to be tested.

8. The method of claim 7, wherein:

the at least one membrane-free optical microphone moves over the material joint while the laser light source moves along at a fixed distance from the at least one membrane-free optical microphone; or the laser light source moves over the material joint while the at least one membrane-free optical microphone moves along at a fixed distance from the laser light source.

9. The method of claim 1, wherein:

the membrane-free optical microphone is moved in a grid-like or meander-like manner over the arrangement to be tested; or undergoes a distance variation with respect to the arrangement to be tested at fixed lateral position.

10. The method of claim 1, wherein the converted mode is evaluated by continuous wavelet transformation of the ultrasound waves.

11. The method of claim 1, further comprising, by an evaluation device:

evaluating pre-processed data by an expert system to predict one or more physical properties of the material interface, the one or more physical properties being selected from a group consisting of: size of an interface area, presence of defects, voids, porosity, and deviation of material properties from expected value ranges; and extracting feature vectors from the ultrasound waves.

12. The method of claim 11, wherein the feature vectors are transferred to an AI module, the AI module outputting either classifications or continuous estimates or predicting at least one model for anomalies in the at least one material joint or material compound.

13. The method of claim 1, wherein the evaluations are performed when the at least one membrane-less optical microphone is positioned above the at least one material joint or material compound.

14. The method of claim 1, wherein the at least one material joint or material compound are part of a battery system.

15. A non-transitory computer readable medium having instructions stored thereon, wherein the instructions are executed by a computer to cause a test apparatus to perform the method of claim 1.

16. A method for testing material joints or material compounds, the method comprising:

providing an arrangement to be tested, the arrangement comprising at least two components connected via at least one material joint or material compound;

exciting, with laser pulses from a laser light source, of acoustic waves in at least one component in the provided arrangement to be tested;

detecting ultrasound waves in an air or gaseous layer adjacent to the provided arrangement to be tested with at least one membrane-free optical microphone;

evaluating the ultrasound waves detected with the at least one membrane-free optical microphone by determining an acoustic pressure variation of the ultrasound waves; and evaluating the at least one material joint or material compound based on acoustic standing waves at resonant frequencies in the material joint or material compound.

17. The method of claim 16 further comprising:

evaluating the acoustic standing waves, wherein the acoustic standing waves are identified by Fourier or Wavelet transformation.

18. A test apparatus for testing of material joints or material compounds comprising:

at least one membrane-free optical microphone;

a laser light source for emitting laser pulses; and an evaluation device, the evaluation device being at least designed to evaluate ultrasound waves detected with the at least one membrane-free optical microphone by determining an acoustic pressure variation of the ultrasound waves, and to evaluate material joints or material compounds based on an occurring mode conversion of a symmetrical mode with a first out-of-plane deflection into an asymmetrical mode with a second out-of-plane deflection.

19. The test apparatus of claim 18, further comprising a control device which is connected to the at least one evaluation device and which is connected to at least the at least one membrane-free optical microphone for the exchange of signal data and command data, and the control device provides command data for the evaluation device in order to create information indicative of the evaluation of material joints or material compounds on a display device.

20. The test apparatus of claim 18, wherein the evaluation device comprises:

at least one expert system or AI module; and at least one database.

* * * * *